United States Patent
Perriere

(10) Patent No.: US 9,998,046 B2
(45) Date of Patent: Jun. 12, 2018

(54) TURBINE HAVING OPTIMIZED EFFICIENCY

(75) Inventor: Bernard Perriere, Echirolles (FR)

(73) Assignee: SAVE INNOVATIONS, Grenoble (FR)

(*) Notice: Subject to any disclaimer, the term of this patent is extended or adjusted under 35 U.S.C. 154(b) by 0 days. days.

(21) Appl. No.: 14/118,334

(22) PCT Filed: May 3, 2012

(86) PCT No.: PCT/FR2012/000172
§ 371 (c)(1),
(2), (4) Date: Nov. 18, 2013

(87) PCT Pub. No.: WO2012/156592
PCT Pub. Date: Nov. 22, 2012

(65) Prior Publication Data
US 2014/0103657 A1   Apr. 17, 2014

(30) Foreign Application Priority Data
May 16, 2011   (FR) ...................... 11 01476

(51) Int. Cl.
*F03D 9/00* (2016.01)
*H02P 9/04* (2006.01)
(Continued)

(52) U.S. Cl.
CPC .............. *H02P 9/008* (2013.01); *F03D 7/028* (2013.01); *F03D 7/0244* (2013.01);
(Continued)

(58) Field of Classification Search
CPC ..... Y02E 10/723; F03D 1/025; F03D 7/0244; F03D 7/0272; F03D 7/0276; F03D 7/028; F03D 7/042; H02P 2009/004
(Continued)

(56) References Cited

U.S. PATENT DOCUMENTS 3,696,311 A * 10/1972 Oushige ................. H02P 23/10
318/810
5,652,485 A * 7/1997 Spiegel et al. ................ 318/147
(Continued)

FOREIGN PATENT DOCUMENTS

CN   202300843 U   7/2012
EP   0 045 264 A   2/1982
(Continued)

OTHER PUBLICATIONS

Machine translation of JP2005094936 retrieved from espace.net.*
(Continued)

*Primary Examiner* — Tulsidas C Patel
*Assistant Examiner* — Thomas Quigley
(74) *Attorney, Agent, or Firm* — Haug Partners LLP

(57) ABSTRACT

The invention relates to a turbine and to the implementation method thereof, said turbine comprising a blade mounted such that it can rotate about a central axis and an electromagnetic synchronous machine arranged with the blade in such a way as to modify the angular rotation speed of the blade in order to optimize the mechanical efficiency of the blade as a function of the speed of the incident fluid acting on the blade.

12 Claims, 4 Drawing Sheets

(51) Int. Cl.
  *H02P 9/00* (2006.01)
  *F03D 7/02* (2006.01)
  *F03D 7/04* (2006.01)
  *F03D 9/25* (2016.01)

(52) U.S. Cl.
  CPC ......... *F03D 7/0272* (2013.01); *F03D 7/0276* (2013.01); *F03D 7/042* (2013.01); *F03D 9/25* (2016.05); *F05B 2220/7066* (2013.01); *F05B 2220/7068* (2013.01); *F05B 2240/941* (2013.01); *F05B 2260/903* (2013.01); *F05B 2270/101* (2013.01); *F05B 2270/1011* (2013.01); *F05B 2270/1012* (2013.01); *F05B 2270/1014* (2013.01); *Y02E 10/721* (2013.01); *Y02E 10/723* (2013.01); *Y02E 10/725* (2013.01)

(58) Field of Classification Search
  USPC ................................. 290/44, 55; 322/24, 28
  See application file for complete search history.

(56) References Cited

U.S. PATENT DOCUMENTS

| | | | | |
|---|---|---|---|---|
| 5,798,632 | A * | 8/1998 | Muljadi | .......................... 322/29 |
| 6,181,112 | B1 * | 1/2001 | Latos | ...................... H02P 9/305 322/29 |
| 6,844,656 | B1 * | 1/2005 | Larsen et al. | .................. 310/268 |
| 2005/0057226 | A1 * | 3/2005 | Kawakami | .............. B60L 11/06 322/24 |
| 2005/0116689 | A1 * | 6/2005 | Fogarty | ..................... H02P 9/08 322/29 |
| 2008/0197794 | A1 * | 8/2008 | Vermeir et al. | .......... 318/400.06 |
| 2008/0315584 | A1 * | 12/2008 | Rozman et al. | ................. 290/34 |

FOREIGN PATENT DOCUMENTS

| | | |
|---|---|---|
| EP | 0 223 731 A | 5/1987 |
| JP | 57-52679 A | 3/1982 |
| JP | 2005-94936 A | 4/2005 |
| JP | 2009-191835 A | 8/2009 |
| JP | 3162839 U | 8/2010 |
| WO | WO 2008/130940 A | 10/2008 |
| WO | WO 2009/129309 A | 10/2009 |

OTHER PUBLICATIONS

Machine translation of EP0045264, which is listed as equivalent to JPS57052679 on espace.net.*

Notice of Reasons for Rejection issued by Japanese Patent Office for corresponding Japanese application 2014-510845 dated Feb. 9, 2016 with English translation.

Office Action issued in corresponding Chinese Application No. 201280031524.6 dated Sep. 21, 2016.

\* cited by examiner

TURBINE HAVING OPTIMIZED EFFICIENCY

This application is a 371 of PCT/FR2012/000172 filed on May 3, 2012, published on Nov. 22, 2012 under publication number WO 2012/156592, which claims priority benefits from French Patent Application Number 1101476 filed May 16, 2011, the disclosure of which is incorporated herein by reference.

FIELD OF THE INVENTION

The present invention relates to a turbine and more specifically to a turbine that can be driven by a low-speed fluid.

DESCRIPTION OF THE PRIOR ART

A turbine is a machine capable of converting the kinetic energy of an incident fluid into mechanical power on a rotary shaft. This mechanical power is then used as required, for example to operate a water pump or to turn an alternator which generates an electric current. A turbine usually comprises several blades attached to a drive shaft. The number of blades and the shape of the blades can vary very widely. The fluid may be liquid or gaseous.

FIG. 1A depicts a first type of turbine 1 according to the prior art. Said turbine 1 comprises, for example, three blades 2 of elongate shape. Each blade has two distal ends each respectively attached at two points 3 and 4 to a shaft 5. The shaft 5 is mounted to rotate about a central axis X. The cross section of the blades is, for example, roughly in the shape of an airplane wing oriented in such a way that when an incident fluid, the speed Vfl of which is directed orthogonally to the central axis X, impinges on the blades, it creates resultant forces on the blades that make the blades turn about the axis X at a rotational angular velocity ω.

FIG. 1B depicts a second type of turbine 1 according to the prior art. Said turbine comprises blades 2 that form an impeller 8 which is mounted on a shaft 5 perpendicular to the plane of the impeller. The shaft 5 is mounted to rotate about the central axis X. When an incident fluid, the speed Vfl of which is oriented along the axis X, impinges on the blades 2 of the impeller, this creates resultant forces on the blades that turn the impeller 8 about the central axis X at a rotational angular velocity ω.

There are many other types of turbine comprising one or more blades rotating about a central axis. For a given incident fluid, the higher the mechanical efficiency of the blade, which is defined as the ratio between the energy transmitted by the blade 2 to the drive shaft 5 and the kinetic energy of the fluid, the more mechanical power Pm is available on the shaft 5. It is advantageous for this mechanical efficiency, which reflects the effectiveness of the turbine, to be maximized.

Existing turbine blades are optimized for efficiency only for a given fluid that has a given speed. For example, the pitch of an impeller of a wind turbine is fixed according to the average dominant wind speed.

SUMMARY

It is an object of one embodiment of the present invention to propose a turbine the mechanical efficiency of which is optimized irrespective of the speed or variations in speed of the incident fluid that drives the blade or blades.

It is an object of another embodiment of the present invention to propose a turbine the mechanical efficiency of which is non-zero even when the fluid intended to drive the blade or blades is at low speed.

Thus, one embodiment of the present invention provides a turbine which comprises a blade mounted to rotate about a central axis, a synchronous electromagnetic machine and adjustment means of the rotational angular velocity of the blade by the synchronous electromagnetic machine in order to optimize the mechanical efficiency of said blade according to the speed of the incident fluid impinging upon said blade.

According to another embodiment of the present invention, the synchronous machine of the turbine comprises a rotor and a stator, the rotor comprising a regulator magnet mounted on the blade, the stator comprising at least one regulator coil.

According to another embodiment of the present invention, the turbine comprises a casing in which the stator is mounted, the blade being arranged in an internal cavity delimited by the casing, said cavity comprising a profile configured to accelerate the speed of the fluid in the region of the blade using a Venturi effect.

According to another embodiment of the present invention, the blade of the turbine forms an impeller mounted to rotate about the central axis.

According to another embodiment of the present invention, the adjustment means of the turbine comprise means of measuring the rotational angular velocity of the blade and the speed of the associated incident fluid, said measurement means being connected to a processing unit for calculating the optimum rotational angular velocity of the blade for which velocity the mechanical efficiency of the blade is at a maximum, and the processing unit being connected to the synchronous machine so as to adjust the rotational angular velocity of the blade to the optimum angular velocity.

According to another embodiment of the present invention, the turbine comprises a synchronous current generator which comprises a field system and an armature, the field system comprising a power magnet mounted on said blade, and the armature comprising at least one power coil.

According to another embodiment of the present invention, the regulator coil of the turbine is coupled by magnetic induction with a power coil.

According to another embodiment of the present invention, a power magnet of the turbine is used as a regulator magnet.

Another embodiment of the present invention provides a method of operating a turbine which involves the following steps: measuring the speed of the fluid and altering the angular velocity of the blade as a function of the measured speed of the fluid so as to optimize the mechanical efficiency of said blade.

Another embodiment of the present invention provides a vehicle which comprises a turbine comprising a blade mounted to rotate about a central axis, a synchronous electromagnetic machine and adjustment means of the rotational angular velocity of the blade by the synchronous electromagnetic machine in order to optimize the mechanical efficiency of said blade according to the speed of the incident fluid impinging upon said blade.

BRIEF DESCRIPTION OF THE DRAWINGS

These objects, features and advantages, together with others, will be set out in detail in the following description of some particular embodiments which is given by way of nonlimiting example with reference to the attached figures among which.

DETAILED DESCRIPTION

For the sake of clarity, only those elements that are beneficial to understanding the invention have been depicted and will be described. For the sake of clarity, like elements have been denoted by like references in the various figures and, furthermore, the various figures are not drawn to scale.

Figure 1A:
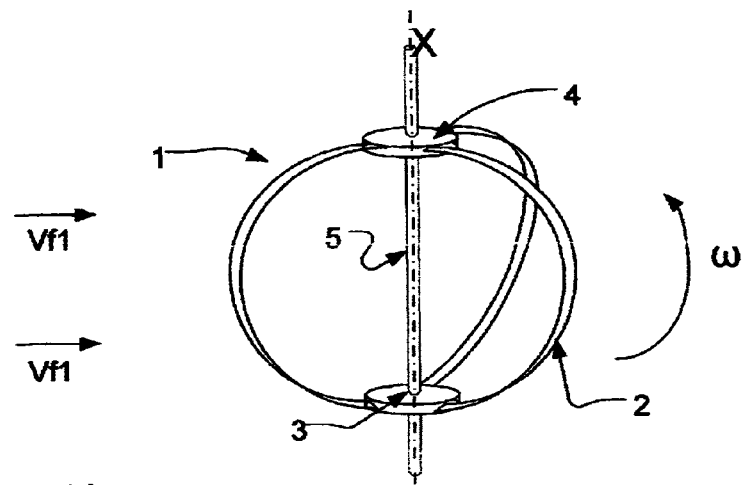
FIG. 1A, described hereinabove, is a schematic view of a first type of turbine according to the prior art.
Figure 1B:
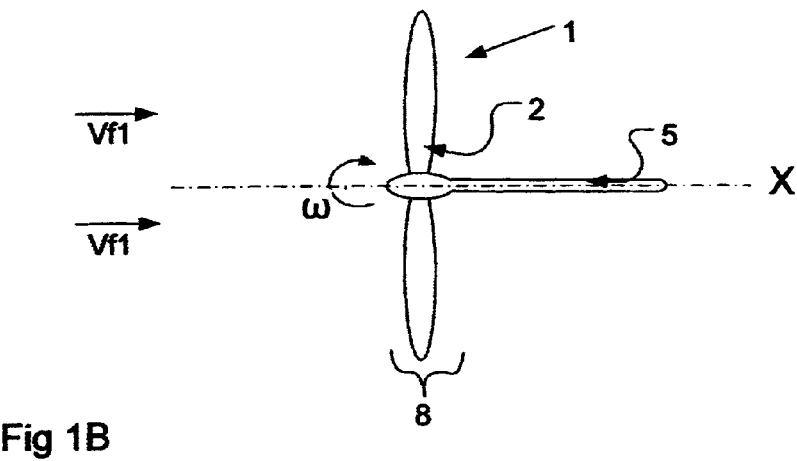
FIG. 1B, described hereinabove, is a schematic view of a second type of turbine according to the prior art.
Figure 2:
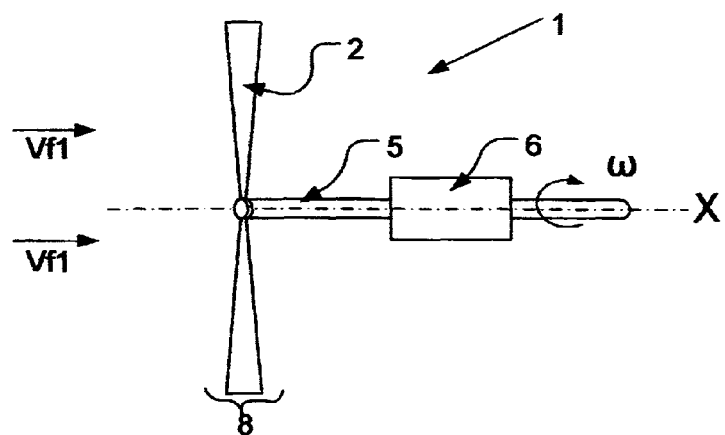
FIG. 2 is a schematic view of a turbine according to one embodiment of the present invention.

FIG. 2 is a schematic view of a turbine 1 of the second type as defined hereinabove in conjunction with FIG. 1B, according to one embodiment of the present invention. The example can be readily transposed to any type of turbine and, in particular, to a turbine of the first type as described hereinabove in conjunction with FIG. 1A. A turbine 1 comprises at least one blade 2 able to form an impeller 8 connected, preferably fixedly, to a shaft 5 mounted to rotate about the central axis X. A motor 6, preferably a reversible motor, is arranged with the blade 2 so as to turn it, it being possible for example for this to be done by coupling the motor 6 to the shaft 5 in such a way as to be able to turn the shaft 5. For preference, the motor 6 is a synchronous electromagnetic machine. The mechanical efficiency of the blade 2 subjected to an incident fluid of speed Vf1 is dependent on the speed at which the blade 2 rotates, as will be taught hereinbelow in conjunction with FIG. 3. The motor 6 allows the rotational speed of the blade to be accelerated or decelerated so as to obtain the best possible mechanical efficiency. Thus, surprisingly, in order to increase the efficiency of a turbine 1 intended to drive a drive shaft 5, it is advantageous for said blade 2 to be driven using an electric motor either to increase the rotational speed of the blade or to decrease it. In other words, the turbine comprises at least one blade 2 mounted to rotate about a central axis X, a synchronous electromagnetic machine and adjustment means of the rotational angular velocity ω of the blade 2 by the synchronous electromagnetic machine in order to optimize the mechanical efficiency of said blade according to the speed Vf1 of the incident fluid impinging upon the blade 2.

Figure 3:
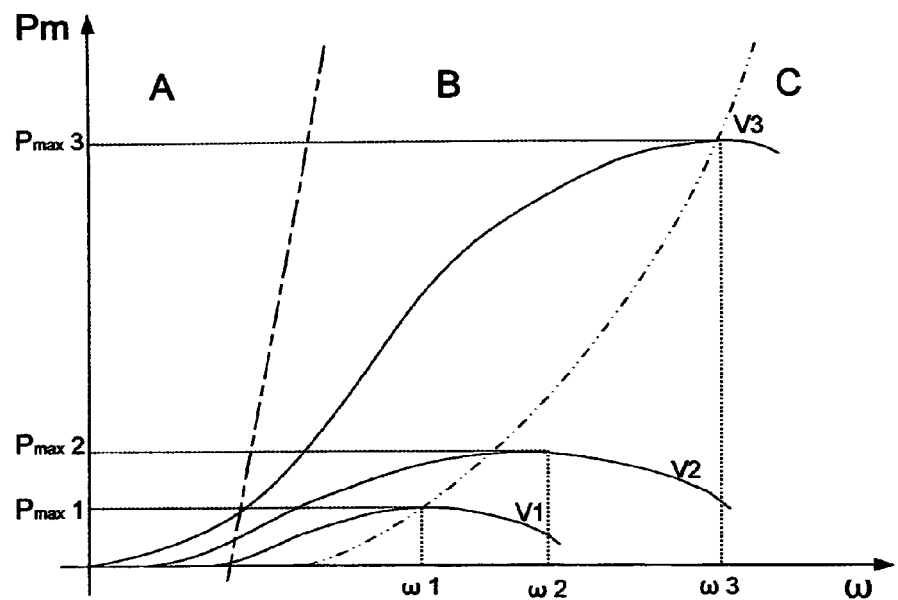
FIG. 3 is a graph showing mechanical power transmitted on the shaft of a turbine by a blade as a function of rotational angular velocity according to one embodiment of the present invention.

FIG. 3 is a graph showing mechanical power transmitted on the shaft of a turbine by a blade as a function of rotational angular velocity of the blade and parametrized by speed of incident fluid. The rotational angular velocity ω is indicated on the abscissa axis labeled ω, the mechanical power Pm transmitted on the rotating shaft is indicated on the ordinate axis labeled Pm. Three curves V1, V2, V3 have been plotted for three increasing incident-fluid speeds Vfa, Vfb, Vfc. The graph has three regions A, B and C. The first region A corresponds to low blade rotational angular velocities ω. The mechanical power Pm transmitted to the shaft increases very slowly as a function of the rotational angular velocity ω of the blade, and can remain zero if the fluid speed is reduced (which is the case of curves V1 and V2 of the graph). In this first region A static friction of the turbine dominates and may even, in extremis, prevent the blade from turning. The second region B corresponds to a moderate blade angular velocity. The mechanical power Pm transmitted to the rotating shaft increases evenly with blade rotational angular velocity ω. In this region B static friction no longer exists and dynamic friction remains low. When the rotational speed of the blade increases, the angle of incidence of the blade in the fluid decreases through the effect of the change in direction of the relative speed of the fluid over the moving blade. The drag of the blade in the fluid decreases, its lift increases and the aerodynamic efficiency increases. The mechanical power Pm transmitted to the rotating shaft increases with the rotational speed of the shaft, to an optimum rotation PMax1, PMax2, PMax3 that corresponds to the respective rotational angular velocities ω1, ω2, ω3 of the blade. The third region C corresponds to high blade rotational angular velocities. The motive power Pm transmitted to the shaft decreases when the angular velocity of the blade increases beyond ω1, ω2, ω3 because the angle of incidence of the incident fluid impinging on the blade is no longer best suited to the profile of the blade (leading to a reduction in lift forces and an increase in drag forces). What is more, dynamic friction forces increase sharply.

To sum up, by way of example, the graph of FIG. 3 demonstrates that for a given blade and a given incident fluid speed, there is an optimum rotational angular velocity ω1, ω2, ω3 of the blade for which the mechanical power PMax1, PMax2, PMax3, and therefore the mechanical efficiency of the blade, or of the turbine, is maximized. For sufficiently low speeds of the incident fluid combined with low blade rotational angular velocities ω, the power transmitted by the blade to the shaft is zero. In such cases, the shaft cannot be turned without an ancillary system. In addition, for sufficiently high rotational angular velocities ω the mechanical efficiency of the blade drops. This observation is why, paradoxically, it may be preferable, in order to optimize turbine efficiency, to reduce the rotational angular velocity ω of the blade.

Figure 4:
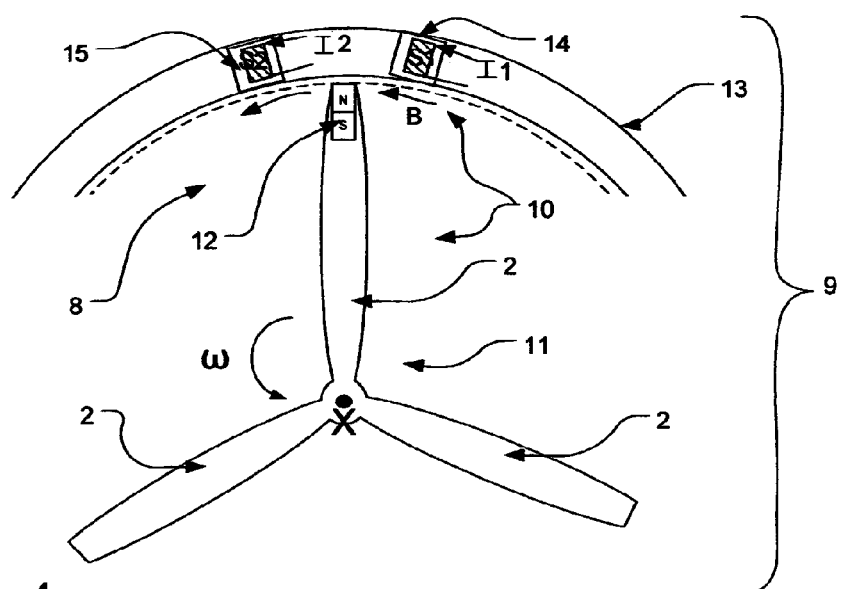
FIG. 4 is a head-on view of a turbine according to one embodiment of the present invention.

FIG. 4 is a head-on view of a turbine according to one embodiment of the present invention. The turbine 9 depicted in FIG. 4 is one exemplary embodiment, notably for the synchronous machine 6, of the turbine 1 depicted in FIG. 2. The operation of the electromagnetic synchronous machine is well known to those skilled in the art and will not be detailed here. An electromagnetic synchronous machine 10 like the one depicted in FIG. 4 comprises a rotor 11 equipped with at least one regulator magnet 12 and with a stator 13, said stator being taken as a fixed reference. The rotor 11 is made up of at least one blade 2, for example of an impeller 8, to which the regulator magnet 12 is attached. Of course, as the impeller may comprise several blades, a regulator magnet 12 may be attached to each or to several blades of the impeller. The regulator magnet 12 may be a permanent magnet or an electromagnet powered with direct current. For preference, the regulator magnet 12 is fixed at the tip of the blade 2 or to a protruding portion of the blade 2 that has been provided for that purpose. A regulator magnet 12 is depicted symbolically as a parallelepiped oriented by the magnetic poles of the magnet. Any customary configuration of magnets of a rotor of a synchronous rotary machine can be used provided that the regulator magnet is secured to the blade 2 of the impeller 8. The stator 13 is equipped with at least one regulator coil 14 or 15. Two regulator coils 14, 15 have been symbolically depicted in FIG. 4. Any configuration of regulator coils, for example with magnetic cores and air gaps, conventionally used in rotary electromagnetic machines can be used here. In accordance with the known method of operation of a synchronous machine, the regulator coils of the stator 14, 15 are powered with alternating current I1, I2 so as to create a magnetic field B that rotates about the central axis X. The rotor 11, equipped with a regulator magnet 12 that is subjected to the rotary magnetic field B generated by the stator 13 is driven in a rotational movement that is synchronized to the magnetic field B of the stator. The rotational speed of the synchronous machine 10 is determined by the frequency of the alternating currents I1, I2 powering the regulator coils 14, 15 of the stator 13. It is known that such a synchronous machine, fitted with rotor position sensors, can be brought to a predefined rotational speed from a position in which the rotor 11 is stopped (brushless motor). The amplitude and phase of the currents I1, I2 in the regulator coils 14, 15 determine whether the synchronous machine acts as a motor or as a current generator. In general, motor mode has a tendency to accelerate the rotational speed ω of the blade 2 about the central axis X by consuming electrical power in the regulator coils. In general, current generator mode has a tendency to decelerate the rotational speed ω of the blade 2 about the central axis X by supplying electric current to the regulator coil power supplies.

Such a synchronous machine operating in symbiosis with a turbine impeller can be adapted to any type of turbine having blades that rotate about a central axis and, in particular, the turbines of the first type as defined in conjunction with FIG. 1A. All that is required for that is for at least one regulator magnet to be fixed to at least one rotary blade, these then operating together like the rotor of a synchronous machine. The stator is arranged around the at least one blade so as to generate the rotary magnetic field needed for turning the rotor. It is preferable, although not indispensible, for the regulator magnet to be fixed at a position which is the most distant from the central axis X of rotation so that the forces applied to the regulator magnet can have the maximal torque with respect to the axis X of rotation of the blade. The synchronous machine 10 can operate with a single blade and have a single regulator magnet and a single regulator coil 14. In that particular configuration of the synchronous machine 10, for each revolution of the blade 2, a motive pulse or a slowing pulse may be applied by the single regulator coil 14 to the single regulator magnet 12.

Figure 5:
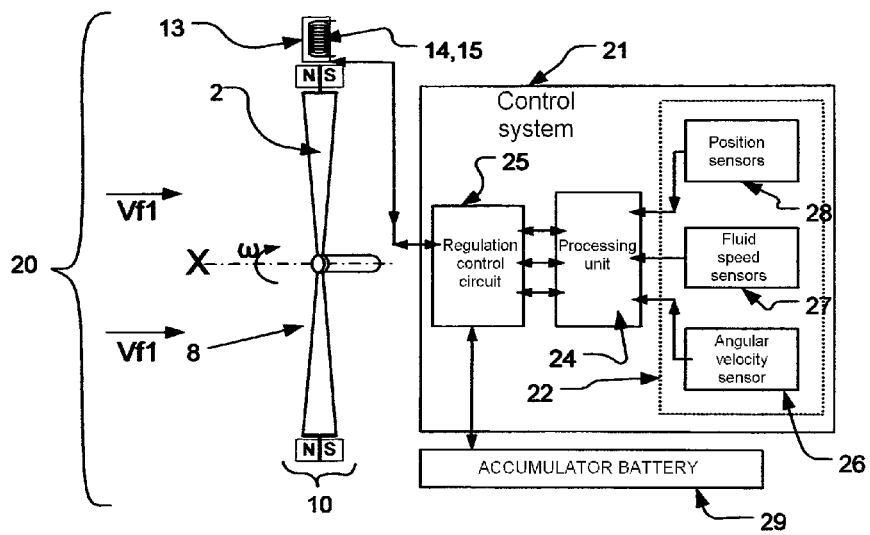
FIG. 5 is a block diagram of a turbine comprising a control system according to another embodiment of the present invention.

FIG. 5 is a block diagram of a turbine 20 comprising a control system 21 that can make up at least part of the adjustment means mentioned hereinabove according to another embodiment of the present invention. By way of example, the turbine 9 described hereinabove in conjunction with FIG. 4 has been used to form part of the turbine 20 described in conjunction with FIG. 5. Any other turbine, associated with a synchronous machine 6, could be used. The turbine 20 comprises the impeller 8 mounted to rotate about the central axis X and forming the rotor of the synchronous rotary machine 10. The stator 13 of this rotary machine comprises the regulator coils 14, 15. The control system 21 comprises a set of sensors 22, a processing unit 24 and regulator control circuits 25. The set of sensors 22 includes at least a sensor 26 that senses the angular velocity ω of the blade 2, a fluid speed sensor 27 and, optionally and non-essentially, a blade position sensor 28. Practical ways of embodying such sensors are known to those skilled in the art and will not be detailed. The control system may comprise a processing unit, for example a microcontroller, which takes account of the values furnished by the various sensors 26, 27, 28. The processing unit determines, for example using operating charts that it has stored in memory, whether in order to improve the mechanical efficiency of the blade the rotational speed ω of the blade needs to be accelerated or slowed. The processing unit then operates a regulation control circuit which supplies current I1, I2 to the regulator coils 14, 15 of the stator 13. The frequency, the amplitude and the phase of these currents will dictate whether the synchronous machine 10 acts as a motor or as a generator. The current needed for operating the synchronous machine 10 is supplied or absorbed by an accumulator battery 29 or by an electrical network external to the turbine.

The efficiency of such a control system is optimal because it is able to recover the kinetic energy of the rotating blade by converting this kinetic energy into electric current during phases in which the synchronous machine is operating as a current generator. Finally, as was specified in conjunction with FIG. 4, the position sensor 28 is not indispensible unless, for the embodiment chosen, the synchronous machine 10 needs, for the purposes of optimizing the mechanical efficiency at very low incident fluid speeds Vf1, to set the blade in rotation from a static state in which the blade 2 is stationary, where the fluid alone is not enough to force the blade into a state of rotation about the axis X.

Figure 6:
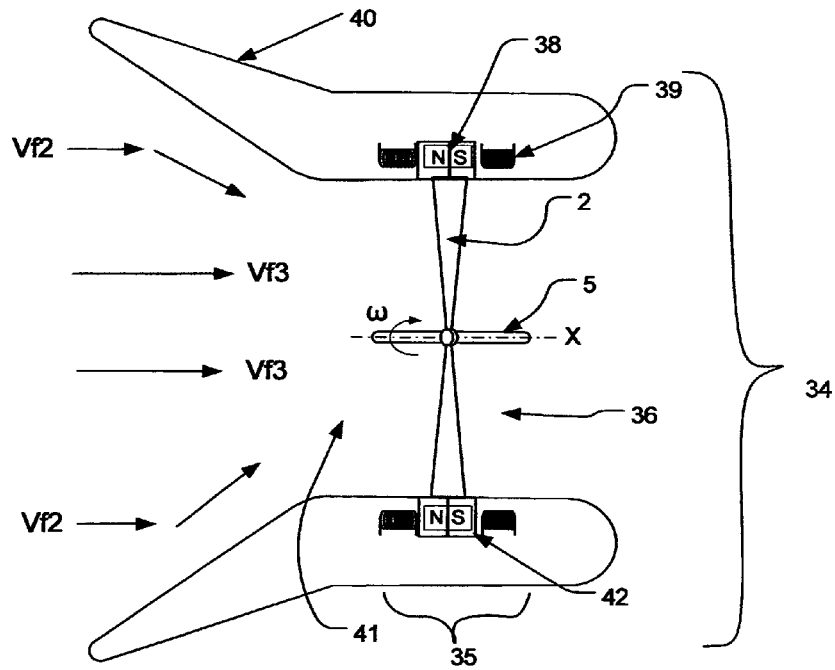
FIG. 6 is a view in cross section of a turbine according to another embodiment of the present invention.

FIG. 6 is a view in cross section of a turbine according to another embodiment of the present invention. FIG. 6 illustrates an embodiment in which a turbine 34 comprises a synchronous machine 35 which comprises a rotor 36 and a stator 37. The rotor 36 comprises at least one regulator magnet 38 mounted on at least one blade 2, preferably at a position which is the most distant from the central axis of rotation X. The stator 37 surrounding the rotor 36 comprises at least one regulator coil 39. In this embodiment, the stator is mounted in a casing 40 delimiting an internal cavity 41 in which said at least one blade 2 is arranged. The internal cavity 41 preferably has a profile configured to accelerate the speed of the fluid in a region of the blade 2 using a Venturi effect. For preference, the cavity is open at both ends, it being possible for the fluid to rush in at a first end and then leave the cavity via a second end. Thus, the plane in which the rotation of the blade is inscribed can then be essentially perpendicular to the direction of the fluid passing through the openings of the cavity at its ends. By increasing the speed of the fluid Vf3 at the blade 2 the casing 40 is an additional means of improving the mechanical efficiency of the turbine notably for low initial incident fluid speeds Vf2, according to the teaching associated with FIG. 3. For preference, the regulator magnet 38 is fixed at the tip of the blade. The regulator magnet 38 may be fixed to a protruding portion of the blade which has been provided for that purpose.

According to one particular way of implementing the embodiment of FIG. 6, the casing 40 comprises, in the region of the internal cavity, an annular groove 42 formed in the plane in which the rotation of the blade 2 is inscribed. This annular grove 42 is configured to accommodate the regulator magnet 38 arranged at the tip of the blade 2 and allow the latter to move in the groove 42 when the blade 2 bearing it is turning. This arrangement is particularly favorable for ensuring that the presence of the regulator magnet 38 does not disturb the flow of the incident fluid.

Figure 7:
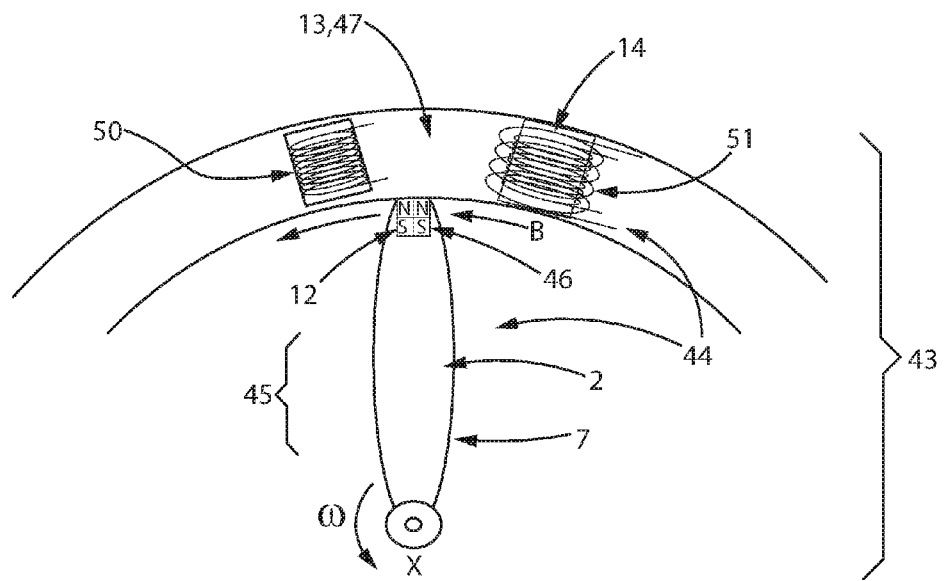
FIG. 7 is a head-on view of a turbine associated with a synchronous generator according to another embodiment of the present invention.

FIG. 7 is a head-on view of a turbine 43 according to another embodiment of the present invention. The synchronous rotary machine 10 described in conjunction with FIG. 4 and intended to adjust and regulate the rotational speed ω of the blade 2 is supplemented by an electromagnetic second synchronous machine 44, configured as a current generator to supply electric power.

The electromagnetic synchronous current generator 44 comprises a field system 45 equipped with at least one power magnet 46, preferably mounted on the blade 2, and an armature 47 comprising at least one power coil. The armature is considered as a fixed reference. The field system 45 according to the embodiment of FIG. 7 is formed by the blade 2 of the impeller 8 to which a power magnet 46 is fixed. This power magnet 46 may be a permanent magnet or an electromagnet powered with direct current. For preference, the power magnet 46 is fixed to the tip of the blade or to a protruding portion of the blade which has been provided for that purpose. The power magnet 46 is depicted in the form of a parallelepiped oriented by the magnetic poles of the magnet in FIG. 7 but any customary configuration of the magnets of a field system of a synchronous generator can be used provided that the power magnet 46 is secured to the blade 2 of the impeller 8. The armature 47 of the synchronous generator 44 is fitted with power coils 50, 51. The power coils are depicted symbolically in FIG. 7. Any configuration of power coils, for example with magnetic cores and air gaps, conventionally used in electromagnetic synchronous current generators can be used. The field system 45 and the armature 47 thus described form the synchronous current generator 44 able to be superposed with and to collaborate with the synchronous machine 10 described in conjunction with FIG. 4. In instances in which the field system 45 comprises several power magnets 46, some of these power magnets 46 may, for example, be used as regulator magnets creating variable magnetic induction in the cores of regulator coils 14, 15. Certain regulator coils 14 (or 15) may, for example, be coupled by magnetic induction to power coils 50, 51. FIG. 7 illustrates the latter configuration. The power coil 51 surrounds the regulator coil 14 creating mutual inductance between the two, power and regulator, coils 51 and 14 respectively which then act as the primary and secondary of an electric transformer. Thus, some of the power current generated by the synchronous current generator 44 is picked up by a regulator coil 14 to power all the other regulator coils in order to alter the rotational angular velocity ω of the blade 2 about the axis X. The turbine 43 then acts as a turboturbine in that some of the electric power generated by the turbine can be used to accelerate the rotational speed of said turbine in order rapidly to reach the optimum rotational speed at which mechanical efficiency is maximized. The control system that controls the angular velocity of the blade 2 and is described in conjunction with FIG. 5 can easily be programmed and adapted by those skilled in the art to the turboturbine 43 defined hereinabove.

Figure 8:
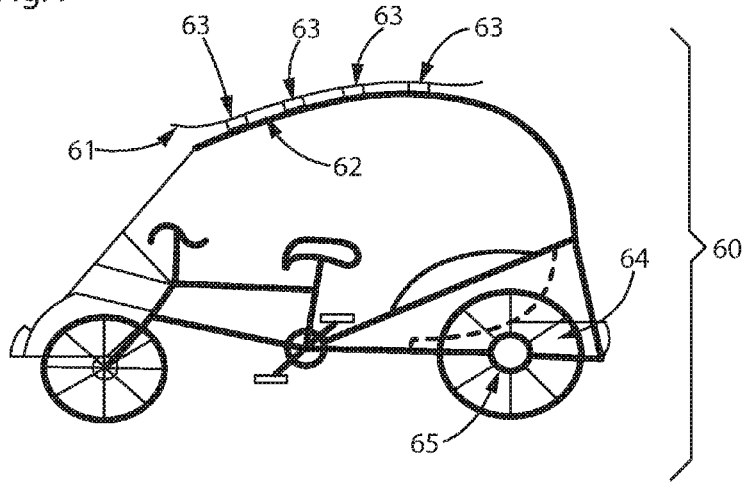
FIG. 8 is a side view of an electric tricycle according to another embodiment of the present invention.

The present invention may notably advantageously be adapted to one or more wind turbines carried onboard a vehicle. In particular, FIG. 8 is a side view of an electric tricycle according to another embodiment of the present invention. The tricycle 60 of FIG. 8 comprises a casing 61 forming a roof and delimiting an internal cavity 62 that is open in the direction of travel of the vehicle and shaped to accelerate the air speed using a Venturi effect. Arranged inside the internal cavity 62 is at least one turbine (wind generator) 63 according to the present invention capable of supplying an electric current even when the tricycle is moving at low and highly variable speeds. The tricycle is fitted with an electric accumulator battery 64 able to store the electrical energy produced by the wind generators 63. The tricycle comprises an electric motor 65, for example a reversible motor, and for example one mounted on the axis of the rear wheel. When the tricycle is stationary, the wind generators may, depending on the weather conditions, recharge the accumulator battery 64. When the tricycle descends a gradient, a dual braking effect is obtained. The first braking is aerodynamic braking performed by the wind generators 63 which therefore recharge the accumulator battery 64. The second braking effect is afforded by the reversible motor 65 operating as a current generator and likewise recharging the battery. When the tricycle is moving forward into a head wind, the wind generators 63 generate an electric current the intensity of which increases with increasing relative wind speed. The electrical energy thus produced can be used, for example, by the reversible motor 65 to assist with moving the tricycle forward. In all instances the electrical energy produced by the turbines 63 can be used to cause the electric tricycle to move forward or for any other purposes.

Some particular embodiments of the present invention have been described. Various alternative forms and modifications will be obvious to a person skilled in the art. In particular, the shape and mode of mechanical operation of the turbines are nonlimiting. In particular, all the embodiments described can be adapted to turbines that have just one blade and are created with just one regulator coil. The present invention can be applied to turbines the incident fluid of which is liquid or gaseous and to wind generators which are a special case of turbines. The power and the dimensions of the turbine are arbitrary. For example, the invention can be applied to wind generators having an impeller several meters in diameter and several tens of meters tall, but likewise to the microwind generators that can be used in roaming hand-held devices.

All kinds of mechanical devices using the mechanical power generated by the turbine of the present invention can be connected to this turbine. The turbines of the present invention can collaborate with any source of energy, electrical or mechanical, for their operation.

The control system and the accumulator battery which have been described in conjunction with FIG. 5 can be incorporated onto one and the same electronic chip.

Various embodiments with various alternative forms have been described hereinabove. It will be noted that a person skilled in the art will be able to combine various elements of these various embodiments and alternative forms without exercising inventive skill.

The invention claimed is:

1. A turbine comprising
   a plurality of blades mounted to rotate about a central axis,
   a synchronous electromagnetic machine, and
   adjustment means for regulation of a rotational angular velocity of the blades by the synchronous electromagnetic machine to optimize a mechanical efficiency of said blades according to a speed of fluid impinging upon said blades so that the mechanical efficiency of the turbine is optimized for all speeds or variations in speed of the incident fluid,
   the synchronous machine comprising:
   a rotor and
   a stator, the rotor comprising a regulator magnet mounted on one or more of the blades, the stator comprising at least one regulator coil, wherein during regulation, regulator current is supplied to the at least one regulator coil to regulate the rotational angular velocity of the blades, and wherein the adjustment means comprises means of measuring the rotational angular velocity of the blades and the speed of the associated incident fluid, said measurement means being connected to a processing unit for calculating the optimum rotational angular velocity of the blades for which velocity the mechanical efficiency of the blades is at a maximum and for which the mechanical power transmitted to a shaft of the turbine is optimized, using operating charts stored in a memory unit, and the processing unit being connected to the synchronous machine so as to adjust, by accelerating or slowing, the rotational angular velocity of the blades to the optimum rotational angular velocity based upon the calculated optimum rotational angular velocity.

2. The turbine as claimed in claim 1, in which the synchronous machine comprises a motor configured to accelerate the rotational angular velocity of the blades.

3. The turbine as claimed in claim 1, comprising a casing in which the stator is mounted, the plurality of blades being arranged in an internal cavity delimited by the casing, said cavity comprising a profile configured to accelerate the speed of the fluid in the region of the plurality of blades using a Venturi effect.

4. The turbine as claimed in claim 1, in which the blades form an impeller mounted to rotate about the central axis.

5. The turbine as claimed in claim 1, further comprising a synchronous current generator comprising a field system and an armature, the field system comprising a power magnet mounted on one or more of said blades, and the armature comprising at least one power coil.

6. The turbine as claimed in claim 5, in which the at least one regulator coil is coupled by magnetic induction with the at least one power coil.

7. The turbine as claimed in claim 5, in which at least one of the power magnets is used as at least one of the regulator magnets.

8. A method of operating a turbine as claimed in claim 1, involving the following steps:
   measuring the speed of the fluid;
   altering the angular velocity of the blades as a function of the measured speed of the fluid to optimize the mechanical efficiency of said blades.

9. A vehicle comprising a turbine as claimed in claim 1.

10. The Turbine according to claim 1, wherein a frequency, an amplitude, and a phase of the current determine whether the synchronous machine acts as a motor or as a generator.

11. The turbine of claim 5, wherein the field system utilizes one or more of the regulator magnets as one or more of the power magnets.

12. A Turbine, comprising:
   a plurality of blades mounted to rotate about a central axis,
   a synchronous electromagnetic machine, and
   adjustment means for adjusting a rotational angular velocity of the blades by the synchronous electromagnetic machine to optimize a mechanical efficiency of said blades according to a speed of fluid impinging upon said blades so that the mechanical efficiency of the turbine is optimized for all speeds or variations in speed of the incident fluid,
   the synchronous machine comprising:
   a rotor and
   a stator,
   the rotor comprising a regulator magnet mounted on one or more of the blades, the stator comprising at least one regulator coil,
   wherein during regulation, regulator current is supplied to the at least one regulator coil to regulate the rotational angular velocity of the blades,
   wherein the adjustment means comprises means of measuring the rotational angular velocity of the blades and the speed of the associated incident fluid, said measurement means being connected to a processing unit for calculating the optimum rotational angular velocity of the blades for which velocity the mechanical efficiency of the blades is at a maximum and for which the mechanical power transmitted to a shaft of the turbine is optimized, using operating charts stored in a memory unit, and the processing unit being connected to the synchronous machine so as to adjust, by accelerating and/or slowing, the rotational angular velocity of the blades to the optimum rotational angular velocity based upon the calculated optimum rotational angular velocity, and
   wherein adjusting, by accelerating and/or slowing, the rotational angular velocity of the blades to the optimum rotational angular velocity comprises:
   increasing the rotational angular velocity of the blades during low speed of incident fluid where static friction of the turbine dominates and where the power transmitted by the blades to the shaft would be zero;
   increase the rotational angular velocity of the blades during an intermediate situation of the speed of the incident fluid where static friction no longer exists and dynamic friction remains minimal; and
   reduce the rotational angular velocity of the blades during a third situation of high blades rotational angular velocities where dynamic friction forces increase sharply.

* * * * *